US006996409B2

(12) United States Patent
Gopinath et al.

(10) Patent No.: US 6,996,409 B2
(45) Date of Patent: Feb. 7, 2006

(54) MULTI-PARTY CONCURRENCE THROUGH SHORT MESSAGE SERVICE EXCHANGES

(75) Inventors: Bhaskarpillai Gopinath, Watchung, NJ (US); Dinesh Kashinath Anvekar, Colonia, NJ (US)

(73) Assignee: Level Z, L.L.C., Piscataway, NJ (US)

( * ) Notice: Subject to any disclaimer, the term of this patent is extended or adjusted under 35 U.S.C. 154(b) by 450 days.

(21) Appl. No.: 10/180,189

(22) Filed: Jun. 26, 2002

(65) Prior Publication Data

US 2004/0002350 A1 Jan. 1, 2004

(51) Int. Cl.
*H04Q 7/20* (2006.01)
(52) U.S. Cl. ............... 455/466; 455/412.1; 455/412.2; 455/414.1; 709/227
(58) Field of Classification Search ............... 455/560, 455/435, 432, 414.3, 466, 518, 426.1, 435.1, 455/432.1, 412.1, 412.2, 414.1; 709/227, 709/204, 203; 705/64
See application file for complete search history.

(56) References Cited

U.S. PATENT DOCUMENTS

| | | | |
|---|---|---|---|
| 5,577,103 A | 11/1996 | Foti | |
| 5,787,357 A | 7/1998 | Salin | |
| 5,903,726 A | 5/1999 | Donovan et al. | |
| 6,026,296 A * | 2/2000 | Sanders et al. | 455/426.1 |
| 6,263,212 B1 | 7/2001 | Ross et al. | |
| 6,650,891 B1 * | 11/2003 | Wierzbitzki et al. | 455/414.3 |
| 2001/0003094 A1 | 6/2001 | Foll | |
| 2001/0011020 A1 | 8/2001 | Nahm | |
| 2002/0013711 A1 | 1/2002 | Ahurja et al. | |
| 2002/0052841 A1 | 5/2002 | Guthrie et al. | |
| 2002/0059146 A1 * | 5/2002 | Keech | 705/64 |
| 2002/0116450 A1 * | 8/2002 | Wei et al. | 709/203 |
| 2002/0173319 A1 * | 11/2002 | Fostick | 455/466 |
| 2003/0003935 A1 * | 1/2003 | Vesikivi et al. | 455/517 |
| 2003/0027595 A1 * | 2/2003 | Ejzak | 455/560 |
| 2003/0050046 A1 * | 3/2003 | Conneely et al. | 455/412 |
| 2003/0055738 A1 * | 3/2003 | Alie | 705/26 |
| 2003/0065788 A1 * | 4/2003 | Salomaki | 709/227 |
| 2003/0208754 A1 * | 11/2003 | Sridhar et al. | 725/34 |
| 2003/0211856 A1 * | 11/2003 | Zilliacus | 455/466 |
| 2004/0219936 A1 * | 11/2004 | Kontiainen | 455/466 |

* cited by examiner

*Primary Examiner*—Sonny Trinh
*Assistant Examiner*—Phuoc Doan
(74) *Attorney, Agent, or Firm*—John T. Peoples

(57) ABSTRACT

In a short message service (SMS) wireline/wireless message system, a separate SMS exchange server linked to a multi-party concurrence server implements a value-added service capability to achieve multi-party concurrence. The basic function of the multi-party concurrence operation is that of changing the contents of a data structure in the server based on the responses received from two or more members. The concurrence operation has many applications, such as, the transfer of money to an account only if two or more persons agree to the transaction.

18 Claims, 17 Drawing Sheets

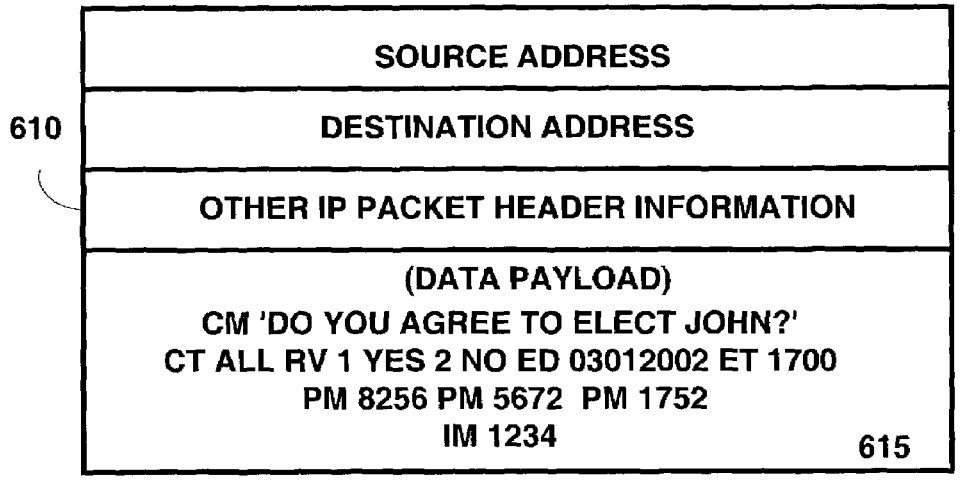

| SOURCE ADDRESS |
| --- |
| DESTINATION ADDRESS |
| OTHER IP PACKET HEADER INFORMATION |
| (DATA PAYLOAD)<br>CM 'DO YOU AGREE TO ELECT JOHN?'<br>CT ALL RV 1 YES 2 NO ED 03012002 ET 1700<br>PM 8256 PM 5672 PM 1752<br>IM 1234 |

FIG. 6C

```
<CONCURRENCE>

<CONCURRENCE_MESSAGE>
          DO YOU AGREE TO ELECT JOHN?
</CONCURRENCE_MESSAGE>
<CONCURRENCE_TYPE>  ALL  </CONCURRENCE_TYPE>
<RESPONSE_VALUES>
          1 YES 2 NO
</RESPONSE_VALUES>
<EXPIRATION_DATE>
          <DAY> 01</DAY> <MONTH>03</MONTH>
          <YEAR>2002</YEAR>
</EXPIRATION_DATE>
<EXPIRATION_TIME> 1700 </EXPIRATION_TIME>
<PARTICIPATING_MEMBERS>
          <MEMBERID>8256</MEMBERID>
          <MEMBERID>5672</MEMBERID>
</PARTICIPATING_MEMBERS>
<INITIATING_MEMBER>
          <MEMBERID>1234</MEMBERID>
</INITIATING_MEMBER>

</CONCURRENCE>
```

| MEMBER IDENTIFIER 810 | NAME 815 | PROFILE INFORMATION 820 | | PASS-CODE 825 |
|---|---|---|---|---|
| | | PHONE NUMBER | EMAIL | |
| 2592 | JOHN JACOB | 732-117-5732 | jj@abc.xyz | abcdefg |
| 1521 | JAY HARI | 408-197-1156 | jh@pqr.mno | pqrstuv |

| SM ID 910 | MEMBER ID 915 | SM ORIGINATION 920 | SM DESTINATION 925 | SM CONTENTS 930 | VALUE-ADDED SERVICE CODE 935 | DELIVERY STATUS 940 |
|---|---|---|---|---|---|---|
| 123788 | 2592 | 732 117 5732 | 732 765 4321 | SEND QUOTE TO <MYEMAIL> | 123 | CANNOT DELIVER |
| 123789 | 2592 | 732 117 5732 | 732 111 3333 | PROJECT MEETING IS CANCELED | 456 | PENDING |
| 123790 | 1144 | 123.69.25.120 | 732 111 2222 | CALL ME AT 7 PM | 456 | DELIVERED |

| MEMBER IDENTIFIER 1200A | MEMBER NAME 1200B | MEMBER'S PHONE NUMBER 1200C | PASS-CODE 1200D |
|---|---|---|---|
| 1952 | JOHN WALKMAN | 635-117-5732 | 154326 |
| 3456 | HARRY JACOB | 202-197-1156 | 873492 |

1110

R1 → (row 1)
R2 → (row 2)

| CONCURRENCE MESSAGE IDENTIFIER 1300A | PARTICIPATING MEMBERS 1300B | CONCURRENCE MESSAGE 1300C | RESPONSE EXPIRATION TIME 1300E | CONCURRENCE TYPE 1300F |
|---|---|---|---|---|
| 234567 | 1952<br>3456<br>1542 | WE AGREE TO TRANSFER $1000 TO ACCOUNT OF JOHN SMITH FROM OUR JOINT ACCOUNT 1234 | 02/28/02<br>5:00 PM | ALL |
| 789012 | 5536<br>2857<br>1234<br>2233 | MEETING ON 3/25/02 AT 3 PM IS ACCEPTABLE TO ME | 01/16/02<br>6:00 PM | > 50% |
| 177934 | 5598<br>1728 | DO YOU THINK THE ORDER FOR PRODUCT XYZ BE DROPPED? | 02/28/02<br>8:00 PM | ANY ONE |

R3 → (row 1)
R4 → (row 2)
R5 → (row 3)

FIG. 14

| CONCURRENCE MESSAGE IDENTIFIER 1400A | PARTICIPATING MEMBERS 1400B | MEMBER RESPONSE 1400C | RESPONSE DATE,TIME 1400D | CONCURRENCE RESULT 1400E |
|---|---|---|---|---|
| 234567 | 1952 | YES | 02/28/2002, 11:00 AM | SUCCESS |
|  | 3456 | YES | 02/28/2002, 10:00 AM |  |
|  | 1542 | YES | 02/27/2002, 10:00 AM |  |
| 789012 | 5536 | YES | 01/15/2002, 11:00 AM | PENDING |
|  | 2857 | PENDING | - |  |
|  | 1234 | NO | 01/14/2002, 10:00 AM |  |
|  | 2233 | YES | 01/15/2002, 3:00 PM |  |
| 177934 | 5598 | NO | 02/28/2002, 9:00 AM | FAILURE |
|  | 1728 | NO | 02/28/2002, 4:00 PM |  |

1120

R6 → (row 234567)
R7 → (row 789012)
R8 → (row 177934)

CM 'DO YOU AGREE TO ELECT JOHN?'
CT ALL RV 1 YES 2 NO ED 03012002 ET 1700
PM 8256 PM 5672 PM 1752
IM 1234

FIG. 16

CONCURRENCE MESSAGE:

CONCURRENCE TYPE: ○ ALL  ○ ANY  ○ > 50%

RESPONSE VALUES: 1 YES
2 NO

EXPIRATION DATE: DAY ☐ MONTH ☐ YEAR ☐

EXPIRATION TIME: ☐  ○ AM  ○ PM

PARTICIPATING MEMBER NUMBERS:

INITIATING MEMBER NUMBER:

FIG. 17

MULTI-PARTY CONCURRENCE THROUGH SHORT MESSAGE SERVICE EXCHANGES

BACKGROUND OF THE DISCLOSURE

1. Field of the Invention

This invention relates generally to communication networks and, more particularly, to a methodology and a concomitant system whereby a short message service exchange effects multi-party concurrence based on the contents of short message service messages.

2. Description of the Background Art

A Short Message Service (SMS) enables a mobile subscriber in a mobile wireless network to send and receive short alphanumeric messages through his/her mobile station. The mobile station in the modern wireless networks can be a cellular phone, a personal digital assistant (PDA), a laptop or any portable device capable of communicating with the wireless network equipment and having an alphanumeric display. With the advent of integration of some of the functionalities of wireless communication services with the Internet, it is also possible to send and receive short messages from a fixed communication station such as an Internet-connected computer.

A high-level block representation of a conventional SMS communication system 100 is shown in FIG. 1. A short message (SM) can originate from a wireless device such as a cell phone 120, a computer 105 connected to the Internet 110, or any similar device. A SM originating from a wireless device 120 is received by a Mobile Switching Center (MSC) 115 via the wireless medium 121 and other entities such as a base station not shown in the figure for simplicity. The MSC then sends the SM to the applicable SMSC (Short Message Service Center) 135 through the network cloud 130 comprising PSTN, wireless cellular, and other specific networks such as the well-known signaling system 7 (SS7) or even proprietary networks. SMSC 135 then determines the destination of the SM (in this example, mobile station 145), and routes it to the appropriate MSC 140, which then delivers the SM to the destination device 145. While two distinct MSCs are shown in FIG. 1 for generality, in cases where the destination device is in the same area as the SM originating device, the SM is handled by a single MSC. Similarly, it is also clear that computer 105 connected to the Internet 110 can transmit the SM to SMSC 135 for handling as outlined above for delivery to mobile station 145. Moreover, the above description of a conventional SMS system is highly simplified to bring out the underlying processes. However, even in the simplified form, it is readily appreciated that in current SMS systems the SM is just delivered to the destination device in the same form it is sent from the originating device. But, with further reflection, it is soon realized that there exists a great potential for using SMs in a SMS system to initiate different operations based on the contents of the SMs. Also, an SM can be preprocessed and valuable information may be added before delivery to the final recipient. These features are not utilized in the state-of-the-art SMS systems. Furthermore, SMs can be used to initiate specific operations at the destination. Keeping this in view, the subject matter of the present invention relates to an SMS exchange that performs value-addition functions based on the contents of SMs.

Discussed below are representative references that provide a backdrop for the subject matter of the present invention. The SMS exchange with value-addition features and the SMS-based multi-party concurrence system in accordance with the present invention are not taught or suggested by this art.

U.S. Patent Application No. 2001/0003094 by Foll describes a method and mobile communications system for controlling a short message service. In this invention, on the basis of the fact that short messages are sent by a communication terminal of a mobile subscriber into a mobile radio network and are routed to a switching facility responsible for the mobile subscriber, a short message together with an address that identifies a service facility responsible for dealing with the short message service for a mobile subscriber is received by the switching facility. The short messages are routed for temporary storage in the service facility and for transmission to a communication terminal of another subscriber if the received address is contained in an address table of the switching facility.

U.S. Patent Application No. 2001/0011020 by Nahm pertains to a method for transferring and reflecting message by using short message service in a portable digital phone. In this invention, a method for operating an SMS in a portable digital phone, more particularly a method for transferring and responding to a message using an SMS in a portable digital phone, is described. The method according to the invention includes the steps of drafting a message with a plurality of optional messages by a sending party, transferring the optional messages as an SMS message during a transferring mode, and receiving and responding to the sender's message by selectively responding to the optional messages.

U.S. Pat. No. 6,263,212 issued to Ross et al. describes a short message service center. The short message service center allows processing characteristics to be modified for service users within a given type so that the storage and delivery of short messages to one service user of a given type may be different for another service user within the same given type. The short message service center alleviates some of the potential "jams" associated with the processing of large distribution lists and closed user groups. The short message service center further allows for distributed administration. Additionally, the short message service center receives a short message in one standard format and delivers the short message in another standard format. The short message service center utilizes both a table routing method and a global title translation method for routing messages to a recipient. It allows a complete transmission of short messages between service entities having differing short message length definitions and has capability for dynamic system re-configuration.

U.S. Pat. No. 5,903,726 issued to Donovan et al. describes a system using portion of a short message payload to identify short message service types and delivering the message if user subscribes to the services. A system and method for providing enhanced short-message service options in PCS systems is described. The generic short-message service is split into unbundled short-message service applications (e.g., emergency messaging, voice mail alert, etc.). Each of these unbundled short message services is recognized at short-message systems, home location registers, and subscriber terminals.

U.S. Pat. No. 5,787,357 issued to Salin pertains short message processing in a mobile exchange. In this invention, a method is described for processing a short message received at a mobile exchange in a cellular radio network, for delivering one short message at a time to a B subscriber. An operation controller is used for observing the operation of the B subscriber so as to detect the delivery of the short message and to prevent the delivery of another short message when the delivery of the preceding short message is in progress. A memory is used for storing rejected short messages and a queue control is adopted responsive to the B-subscriber operation controller for reading the rejected short message from the memory so as to initiate the delivery of the short message to the B subscriber when the delivery of the preceding short message is completed.

U.S. Pat. No. 5,577,103 issued to Foti describes a method of providing service information from a subscriber service profile to subscribers in a cellular telecommunications network using the short message service. The network includes a mobile station having a visual display, a mobile switching center, and a home location register for storing the subscriber service profile. A request for the service profile information is transmitted from the mobile station to the mobile switching center and the home location register. The mobile switching center retrieves the service profile information from the home location register. The service profile information is appended to an SMS message that is transmitted from the mobile switching center to the mobile station. The service profile information is then provided in a voice message or displayed on the visual display of the mobile station. Thus, this invention provides only basic additional processing of an SMS message before delivery to the final recipient.

U.S. Patent Application No. 2002/0052841 by Guthrie pertains to an electronic payment system facilitating person-to-person payments, person-to-business payments, and business-to-business payments over a computer network. Some embodiments of the invention allow users to transfer funds to other users with a telephone number, but multi-party concurrence with SMS messages is not involved in this invention.

U.S. Patent Application No. 2002/0013711 by Ahuja pertains to a stand-alone notification system, including a notification server which generates electronic messages to registered customers upon their request or upon a host business request. The customer provides the system with his/her messaging identification ("ID"), e.g. e-mail address, GSM (global system for mobile communications) or other mobile phone numbers that are able to accept, e.g., short message service ("SMS") messages, facsimile number, and/or telephone number. Customers can register with the host notification server without having any relationship, banking or otherwise, with the host. Customers can choose between different notification channels such as e-mail, SMS message, fax or pager.

While the above representative art deals with various aspects of SMS message systems, the art is devoid of a separate SMS exchange with value-addition capability in accordance with the present invention. Moreover, the art is devoid of value addition service involving multi-party concurrence by using SMS messages such as described herein.

SUMMARY OF THE INVENTION

These shortcomings and other limitations and deficiencies are obviated in accordance with the present invention by a method, and concomitant circuitry, to implement a short message value-added services for multi-party concurrence.

In accordance with the broad method aspect of the present invention, a method for registering concurrence among multiple members includes: (1) sending a concurrence short message service (SMS) message to each participating one of the members at the request of a concurrence initiator; (2) sending, in reply to the concurrence SMS message, a SMS response from each participating member; and (3) processing each SMS response to arrive at a concurrence result.

A broad system aspect of the present invention is commensurate with the aforementioned broad method aspect.

BRIEF DESCRIPTION OF THE DRAWINGS

The teachings of the present invention can be readily understood by considering the following detailed description in conjunction with the accompanying drawings, in which:

FIG. 6C depicts another example of the raw text of a data packet which contains data to invoke a teleconference;

FIG. 6D depicts the conversion of the raw text of FIG. 6C into XML format;

FIG. 8 depicts exemplary records in the member database of FIG. 7;

FIG. 9 depicts exemplary records in the SM delivery database of FIG. 7

FIG. 12 illustrates the layout of the member database of FIG. 11;

FIG. 13 illustrates the layout of the concurrence message database of FIG. 11;

FIG. 14 illustrates the layout of the concurrence results database of FIG. 11 ;

FIG. 16 illustrates sample SMS message for multi-party concurrence request by a multi-party concurrence initiator; and FIG. 17 illustrates the Web page format for requesting a multi-party concurrence.

To facilitate understanding, identical reference numerals have been used, where possible, to designate identical elements that are common to the figures.

DETAILED DESCRIPTION

Figure 1:
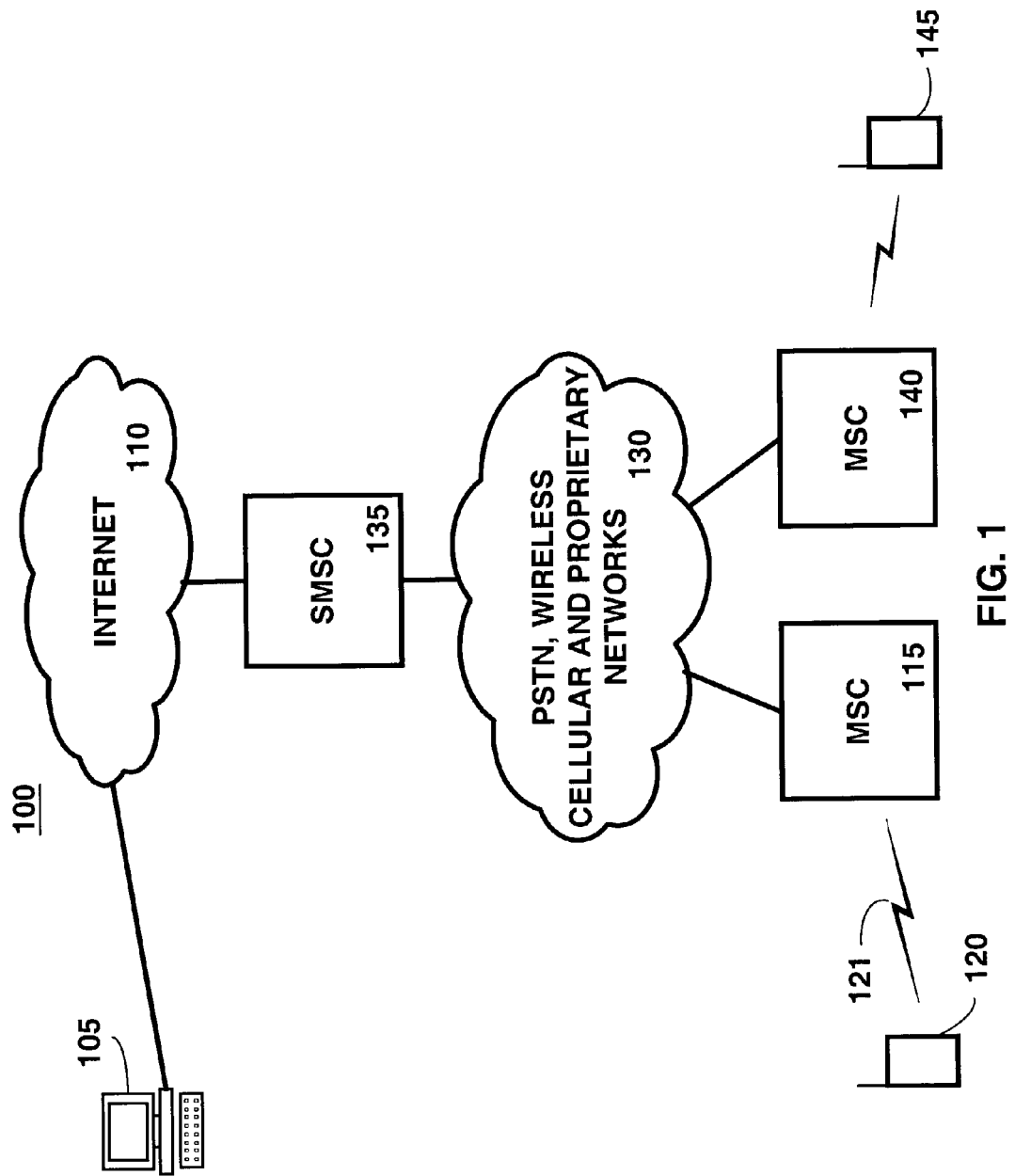
FIG. 1 is a high-level block diagram of a wireless system used to describe a conventional short message service involving mobile devices such as a cell-phone.
Figure 2:
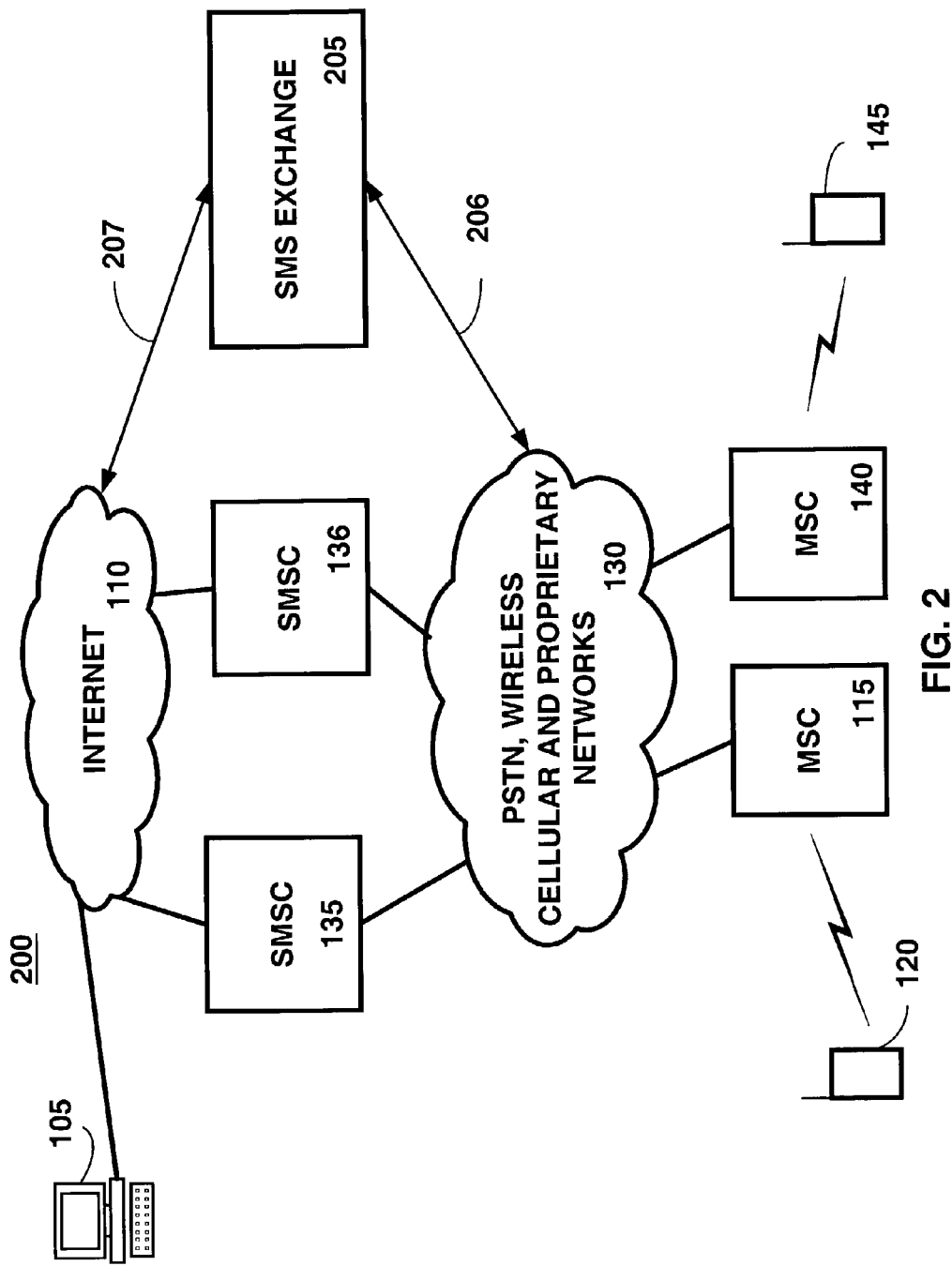
FIG. 2 is a high-level block diagram of a short message service system wherein a short message service exchange in accordance with the present invention is shown in overlay fashion on the system of FIG. 1.
Figure 3:
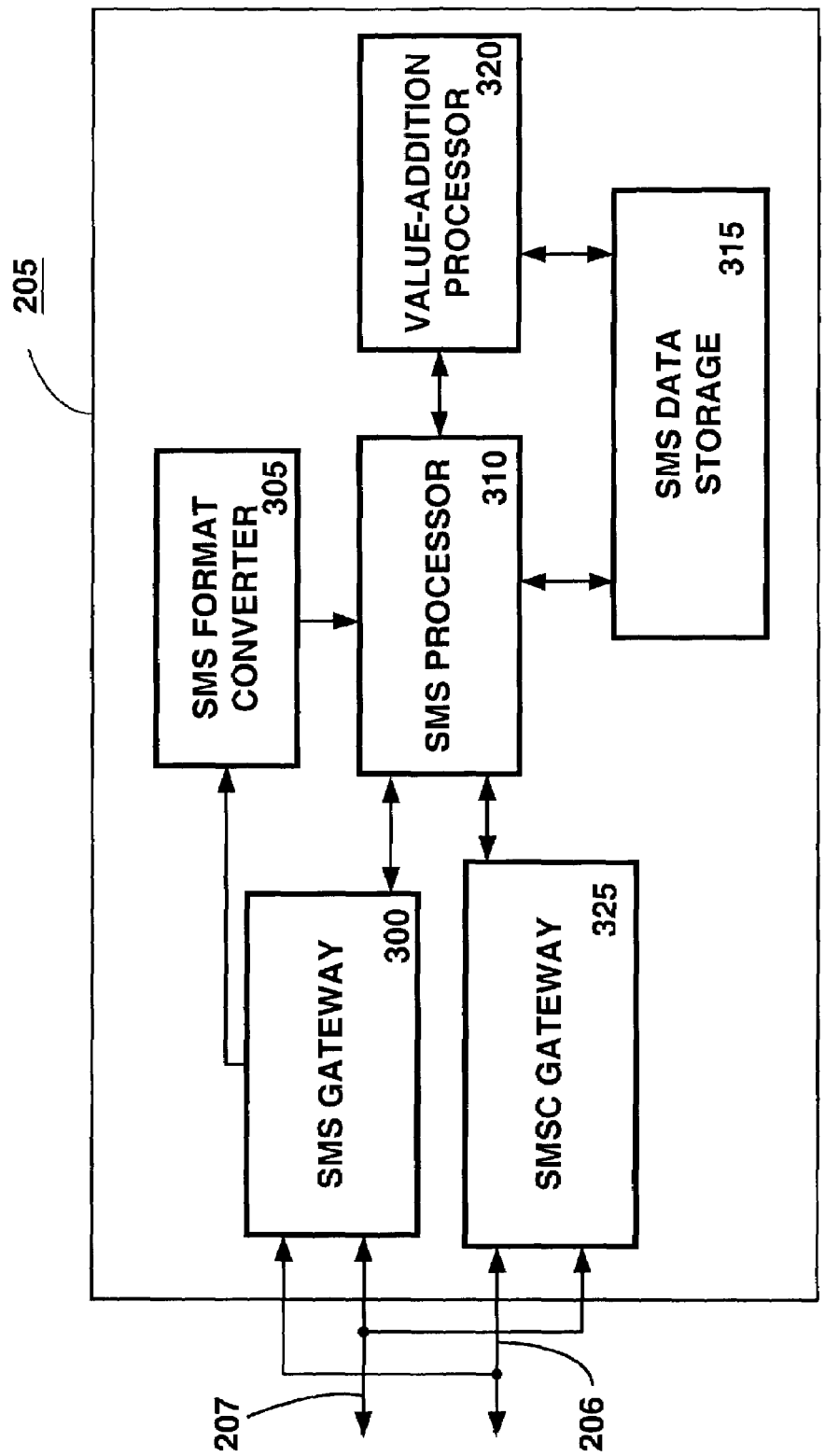
FIG. 3 is a high-level block diagram depicting the components of the short message service exchange of FIG. 2.
Figure 4:
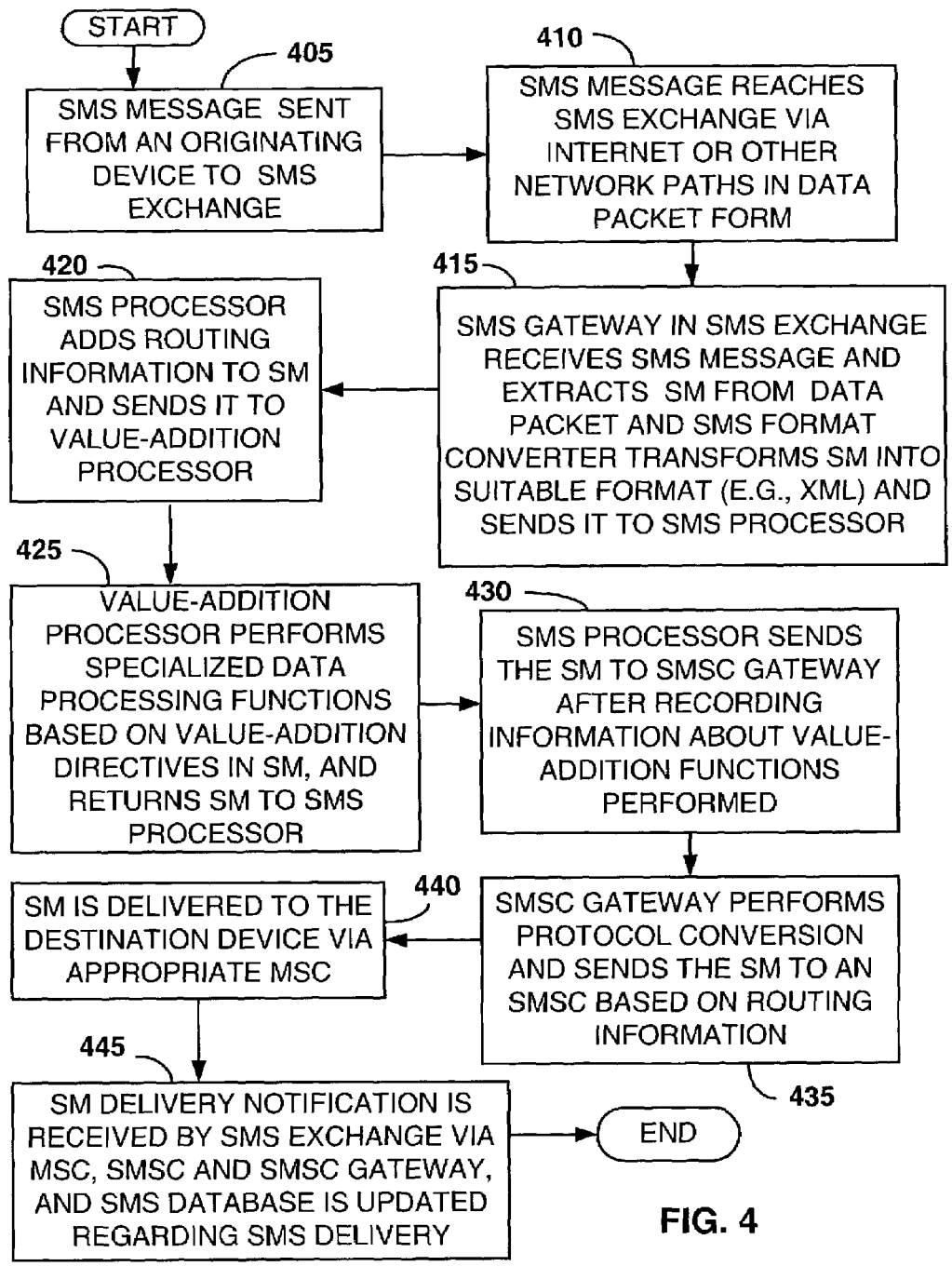
FIG. 4 is a flow chart depicting the processing to deliver a short message for implementing value-added functionality.

A high-level circuit block diagram of SMS system 200 useful as a building block to implement an embodiment of the multi-party concurrence system in accordance with the present invention is shown in FIG. 2 wherein an SMS exchange performs value-addition to SMs in addition to normal routing and sending of SMs; the multi-party concurrence system is discussed in detail after the components of FIG. 2 are described. FIG. 2 is a modified depiction of FIG. 1 wherein SMS exchange 205 is shown in overlay fashion on the components of FIG. 1. In system 200, all SMs pass through the SMS exchange 205 before reaching their respective destinations. The different components of the SMS exchange 205 are shown in FIG. 3 (to be discussed shortly in conjunction with FIG. 4). Each of these components may be implemented on one or more separate computers or may be integrated on a single computer depending on the desired SMS rate handling capacity. A flowchart showing the steps in delivering an SM is shown in FIG. 4, and includes the following processes:

Process 405: An SM is originated, for example, in SMS system 200 by computer 105 or wireless device 120. If the SM is sent from a computer 105, it is sent to the IP (Internet Protocol) address of the SMS exchange 205 via link 207. In case the SM is sent from a wireless device such as cell-phone 120, it is directed to the phone number that corresponds to the SMS exchange 205 via phone line 206. An exemplary message sent from computer 105 to the Internet e-mail address SMdest@isp.com may be of the form "send quote to <myemail> and call me on <myphone>". The value-added service corresponding to this message is the replacement of the alias names between the delimiters '<' and '>', namely, 'myemail' and 'myphone', with the actual e-mail address and phone number of the originator.

Process 410: In the case of the SM originating from an Internet connected device 105, the SM directly arrives at the SMS exchange via the Internet 110 over link 207. But, an SM originating from a wireless device 120 first arrives at an SMSC 135 via an MSC 115. The SMSC 135 forwards the SM to an SMS exchange 205. An SM thus arrives at the SMS exchange 205 via a communication network such as the Internet 110, or a network 'cloud' 130 comprising PSTN, wireless cellular networks or other networks. In either case, the SM arriving at the SMS exchange is encapsulated within a data packet.

Figure 5:
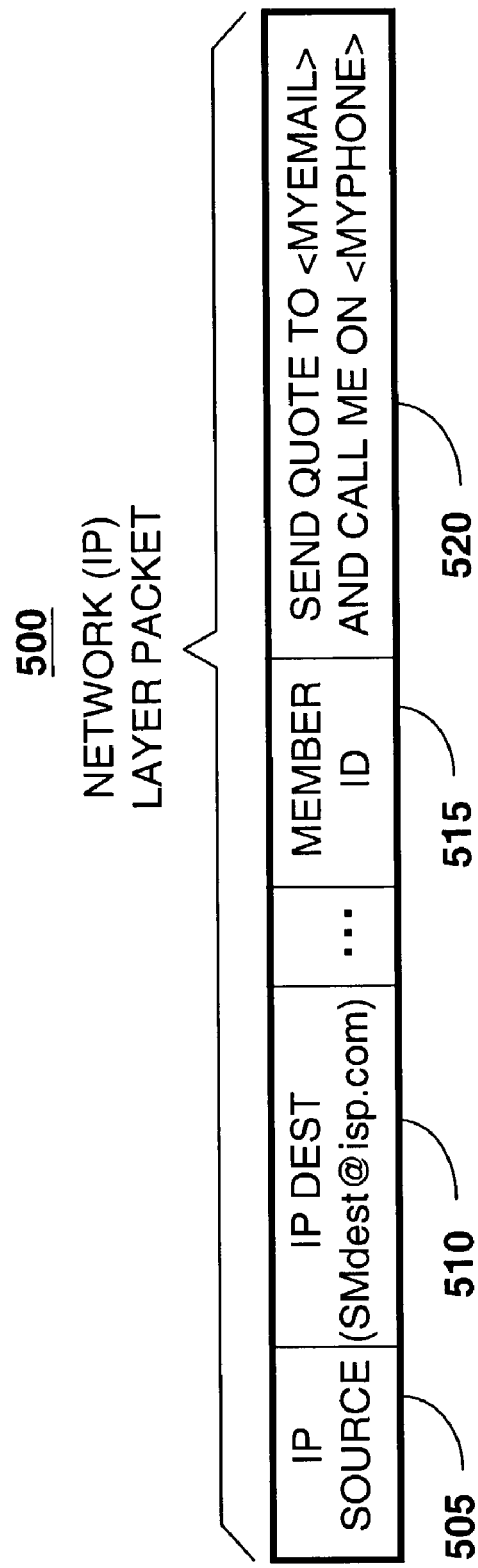
FIG. 5 depicts the layout of a data packet for an exemplary short message wherein keywords are replaced by actual data for a given originator/member.

A data packet corresponding to the aforementioned exemplary message is shown in FIG. 5. As is typical, the IP layer packet 500 has header information such as IP source (505), IP destination (510), member field (515), and so forth, as well as a data payload field (520). The utility of the member field will be discussed below.

Process 415: In the SMS exchange 205, the SMS gateway 300 of FIG. 3 extracts the contents of the SM from the different formats in which they arrive. For instance, an SM received via the Internet will usually be in the form of IP (Internet Protocol) packets. The extracted SM is then sent to an SMS format converter 305. The raw SM is generally in alphanumeric text form along with other information pertaining to the source and destination. The SMS format converter 305 transforms the contents of the SM into a format suitable for efficient processing by the SMS processor 310. An example of such a format in the current state of the art is the XML (Extensible Markup Language) format. With XML, customized tags and other overlay data are added to the raw SM contents to enable value addition functions to be performed efficiently.

Figures 6A, 6B:
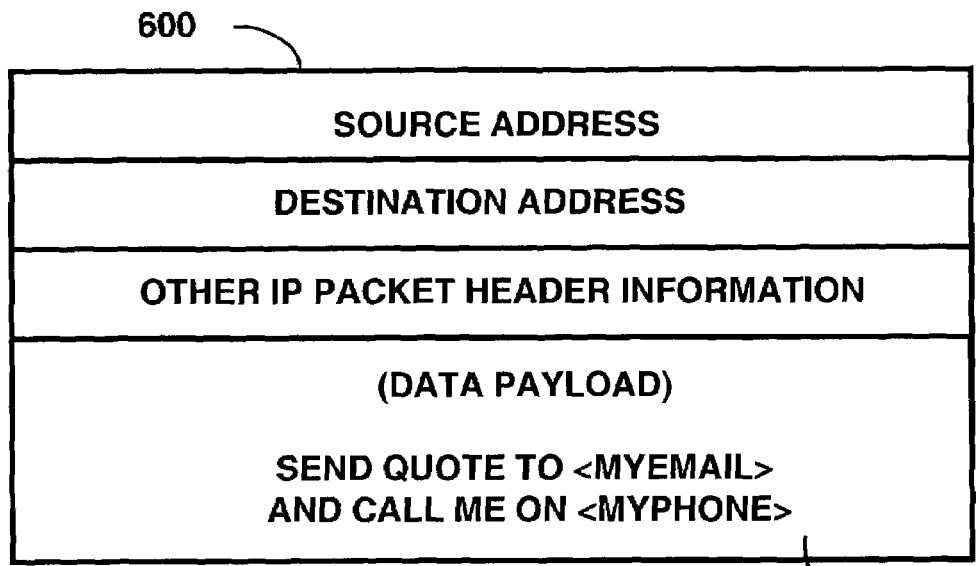
FIG. 6A depicts the raw text of the data packet of FIG. 5 in top-down fashion.
FIG. 6B depicts the conversion of the raw text of FIG. 6A into the Extensible Markup Language (XML) format wherein data items are tagged by customized XML tags.

As one example, a simplified format of IP packet 600 including an SMS message as data portion 605 is shown in FIG. 6A, which depicts the contents of FIG. 5 in a top-down manner. The raw ASCII text in the IP packet is converted into an XML format as shown in FIG. 6B. As seen here, data items are tagged by customized XML tags such as <KEYWORD> and </KEYWORD>. The processing of the SM contents by the inclusion of such tags becomes easier for other functional entities in the system.

As another example, a simplified format of IP packet 610 including an SMS message as data portion 615 is shown in FIG. 6C, which depicts a packet that may be used to initiate multi-party concurrence (the details of multi-party concurrence will be discussed in the sequel). The raw ASCII text in the IP packet is converted into an XML format as shown in FIG. 6D. As seen here, each data item is tagged by customized XML tags such as <CONCURRENCE> and </CONCURRENCE>.

The SM in XML format is then passed on to the SMS processor 310.

Process 420: SMS processor 310 stores the source, destination and other relevant information for each message in the SMS data storage 315. Based on the destination information, SMS processor 310 adds routing information required for routing the SM as per a selected routing policy—such routing policies are conventional and as such are not encompassed by the present invention. For example, a least cost routing may be used to send the SM to optimize the communication costs, whereas a least time to deliver policy sends the SM along fast routes to minimize the total delivery time for urgent messages. SMS processor 310 accesses any information required for routing from the SMS Data Storage 315. The SMS processor 310 then sends the SM to the Value-Addition Processor (VAP) 320.

Process 425: The VAP 320 performs value addition functions on the SM based on the stored programs in its memory and the data in the SMS data storage 315. For instance, a user may instruct through his SM that his contact email be sent to the recipient of the SM by just typing the keyword 'myemail' in his SM, as exemplified by the data payload 520 in FIG. 5. Such keywords may be distinguished from regular text in the message by enclosing them in delimiters such as the ASCII characters '<' and '>'. Alternatively, for ease of composing an SM while sending from a cell-phone, a character such as 'K' may precede a key word. Thus, 'K myemail' would mean that 'myemail' is a keyword. Yet another alternative is to define a set of keywords that cannot be used in the normal text of an SM. The VAP then looks up that user's data, based upon the Member ID (515) in the SMS data storage 315 and inserts the user's full email address in place of the keyword 'myemail'. Similarly, a variety of value addition functions could be defined to perform value addition services based on different product definitions and policies specified in the SMS exchange system.

It is noted that there may be different product definitions within a given service type, and several policies could be defined for use under a given product definition. For example, under a service type called 'SMS initiated teleconferencing', one product P1 may be defined as teleconferencing with the maximum number of members limited to 5. Yet another product P2 may be restricted to members with cellular phones only. Further, under product P1, a policy may involve permitting members to join a teleconference within certain duration from the start of the teleconference, and yet another policy may allow members to join a teleconference at any time. The choice of a product and a policy will appropriately determine the cost for the service.

After fully processing the SM, VAP 320 then returns the SM to SMS processor 310.

Process 430: SMS processor 310 then records the completion of value-addition function and any identifiers required for costing and fee calculation for each SM or rating based on pre-defined SMS delivery plans. The SM is then sent to the SMSC gateway 325.

Process 435: SMSC gateway 325 converts the SM in XML format into formats suitable for sending them to standard state-of-the-art entities such an SMSC 135 or SMSC 136, as per well-known communication protocols. For instance, a common protocol used to communicate with a SMSC is the SMPP (Short Message Peer to Peer) protocol (see, for example, http://smsforum.net/doc/public/FAQ/Gen-FAQ.html). The SM is sent to SMSC 136 which has been chosen by the SMS exchange based on service agreements in force and SM routing algorithms used in the system.

Process 440: From SMSC 136, the SM is then delivered to the final recipient 145 via MSC 140 following the standard routing process.

Process 445: After successful delivery of an SM, a delivery notification message flows back to the SMS exchange 205 via MSC 140, SMSC 136, and SMSC gateway 325. The SMS processor 310 in the SMS exchange 205 then updates the database record for the SM with the delivery notification details in SMS data storage 315.

Figure 7:
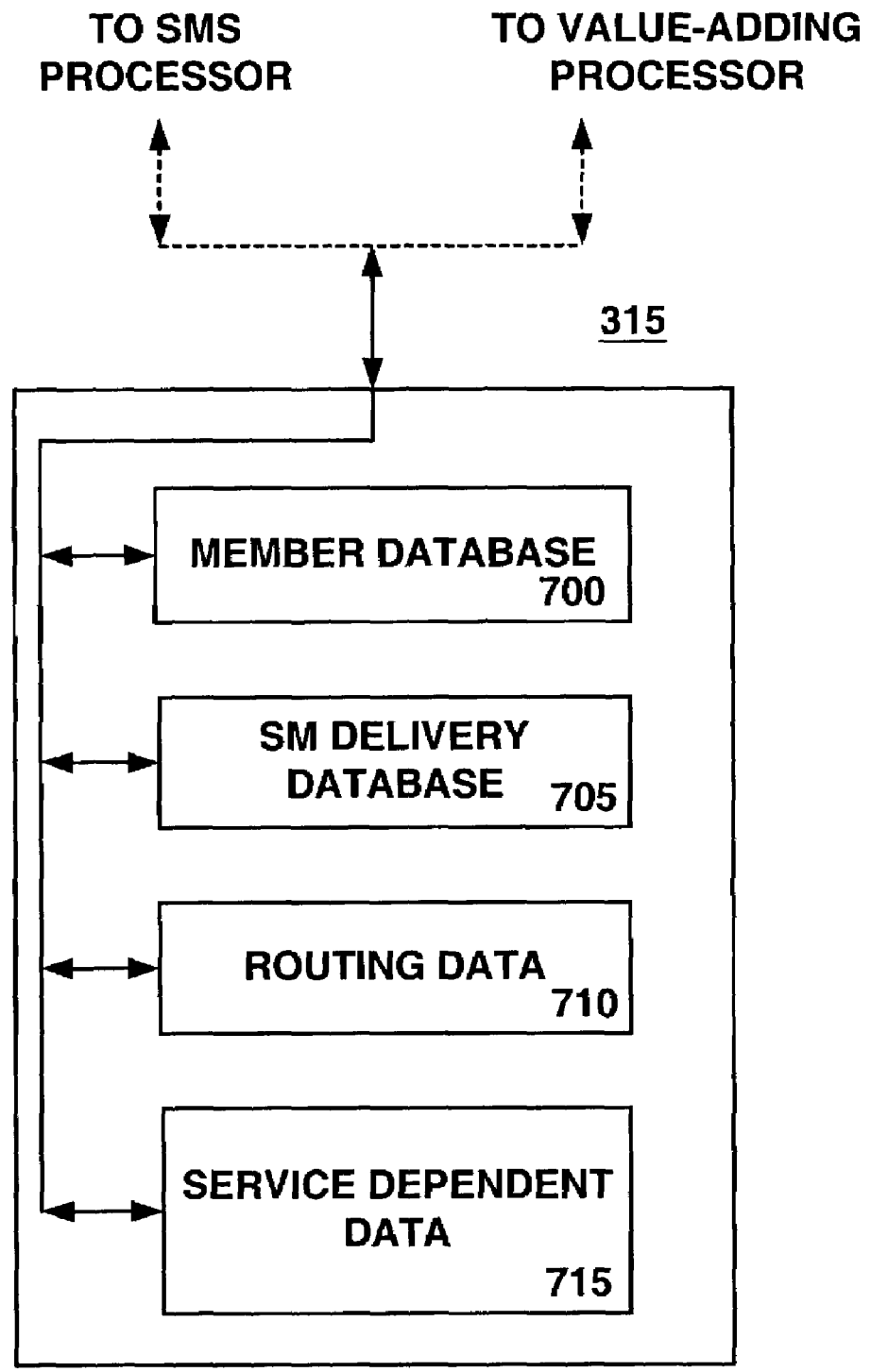
FIG. 7 depicts components of the SMS data storage device of FIG. 3.

Referring next to FIG. 7, a diagrammatic representation of an embodiment of SMS Data Storage 315 is shown. Data storage 315 is a memory that typically includes one or more machine-readable media. Such media include, as is well-known in the art, an appropriate combination of magnetic, semiconductor and optical media. Memory is preferably capable of supporting searching and storing of digital multimedia data such as text and audio. Memory (or portions thereof) may reside on single computer, or may be distributed in a known manner among multiple computers.

In the present embodiment, data storage 315 includes member database 700, SM delivery database 705, routing data 710, and other service dependent data 715.

The rows and columns of the databases described herein represent records and fields thereof, respectively. In the described embodiments, the databases are used in a relational arrangement, as is well-known in the art, so that the databases relate to one another by way of fields that store common data. It is to be noted that while the following description refers to specific individual databases, formats, records, and fields, those skilled in the art will readily appreciate that various modifications and substitutions may be made thereto without departing from the spirit and scope of the present invention.

Referring now to FIG. 8, an embodiment of member database 700 is depicted. Database 700 stores data relating to member accounts that are maintained for account holders. Each record (row) of database 700 represents such an account. For exemplary purposes, two records R1 and R2 are shown.

Field 810 stores a member identifier that is associated with and that uniquely identifies a member account. In this embodiment, the member identifier is a four-digit member number. The number of digits in this filed can be fixed depending on the maximum expected number of members in any SMS system. Other types of account identifiers with alphanumeric characters may be used if required. Field 815 is used to store the name of a member. In one embodiment, the name stored in field 815 is a digital audio file (or a pointer thereto) that contains a pre-recorded audio sample of the account holder's name. The audio recording of member names may be played back while interacting with users with telephone or other voice playback instruments. Field 820 stores the profile information of a member such as phone number and email address of the member. It is possible to store multiple possible phone numbers and emails here, and also other profile information not shown here. While sending SMs from devices other than a wireless phone a member is required to login using a pass-code. Field 825 stores the member's pass-code that is used to authenticate the use of the SMS system by the member.

Referring next to FIG. 9, an embodiment of SM Delivery database 705 is depicted in detail. Database 705 stores data relating to SMs processed through the SMS exchange. One record (row) of database 705 is maintained for each SM. For exemplary purposes, three records R3.1, R3.2 and R4 are shown. Field 910 stores an SM identifier that uniquely identifies an SM. For exemplary purposes, the SM identifier is shown as including six digits. Field 915 stores the identifier of the member who has sent the SM. Field 920 is used to store SM origination information that can be either a wireless phone number or the IP (Internet Protocol) address of the computer from which the SM has been sent. Similarly, field 925 stores the destination information for an SM, which can be a wireless phone number or an IP address. Field 930 stores the actual SMs in the form they were received. For simplicity in representation, only the ASCII characters of some sample SMS messages or parts of messages are shown in FIG. 9. Alternatively, pointers to SMs stored elsewhere in memory can be stored in field 930 (not exemplified). Field 935 stores a value-addition service code that indicates the type of value-addition function performed on an SM. The value-addition service code is useful for determining the charge incurred by a user in sending an SM. Different rating schemes can be applied while charging the SM senders based on different service plans to which the users can subscribe. Field 940 indicates the delivery status for an SM. The delivery status could indicate information about an SM delivery such as 'Delivered', 'Pending', or 'Cannot deliver'. This information can be made available to a sender of an SM at his/her mobile phone or computer.

With reference again to FIG. 7, routing data 710 contains information about the different SMSC gateways and SMSCs and their connectivity data. As mentioned earlier, different services connected with SMS can be supported by the SMS system described herein. Relevant data required to support such services is represented in this embodiment as service dependent data 715. For example, in a multi-party concurrence service (which is described below in detail) member IDs and pass-codes would be stored as service dependent data 715.

Multi-party Concurrence

Figure 10:
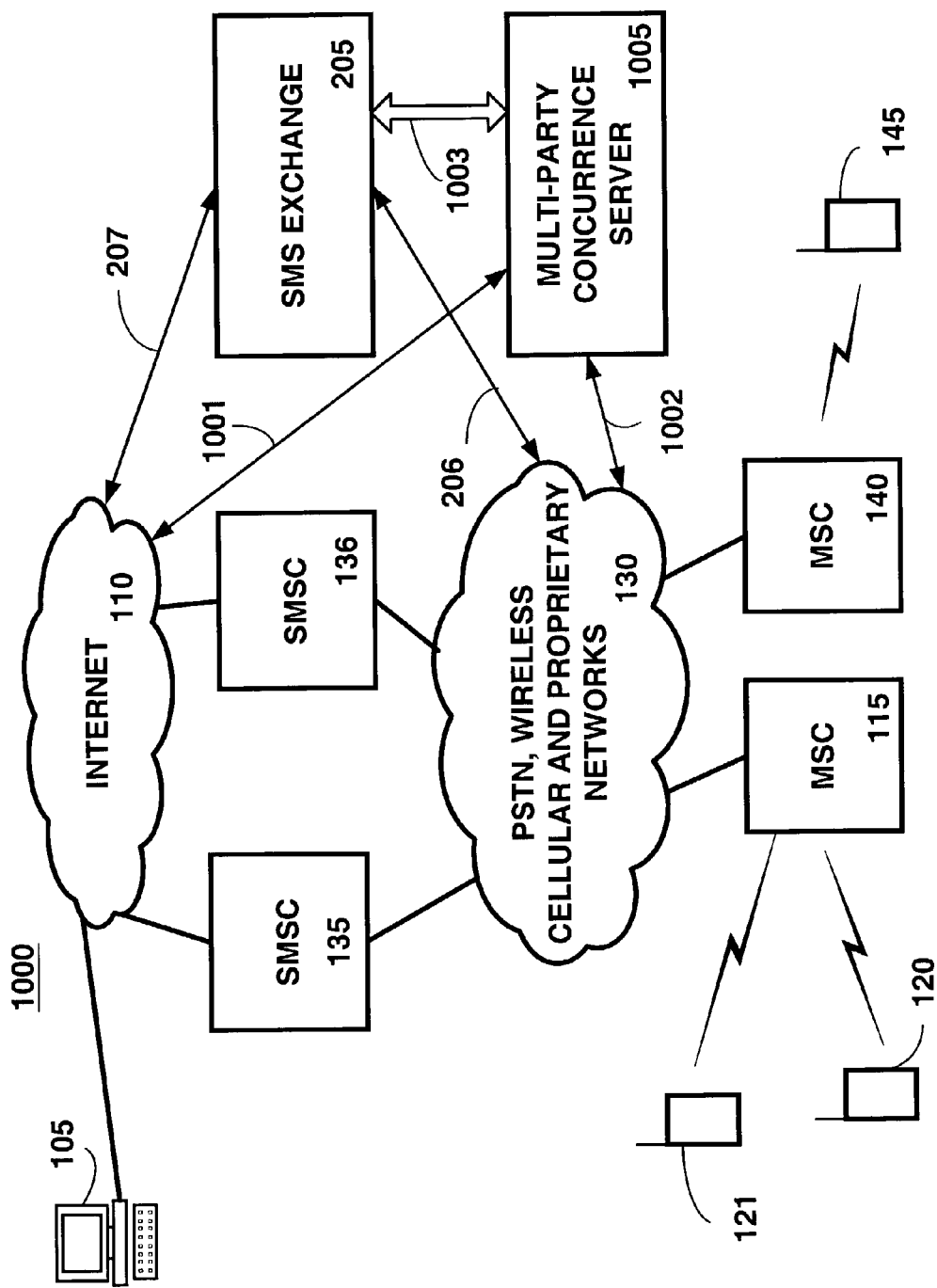
FIG. 10 is a high-level block diagram of a multi-party concurrence system wherein a multi-party concurrence server in accordance with the present invention is shown in overlay fashion on the system of FIG. 2.

A preferred embodiment of this invention includes a method of achieving concurrence among two or more individuals by using the SMS exchange described in the previous sections. A schematic representation of SMS based multi-party concurrence system is shown in FIG. 10. In this system, each party has a wireless cellular phone (120,121, 145) capable of sending SMS messages via an MSC (115, 140). Alternatively, a concurring party could have a computer 105 connected to the Internet 110. Registered members only can use the concurring facility. A multi-party concurrence server 1005 is interfaced to the SMS exchange 205, as well as Internet 110 and networks 130 via links 1001 and 1002, respectively. SMS messages pertaining to a multi-party concurrence are sent from the SMSCs 135 and 136 to the SMS exchange 205. It is assumed here that the SMS exchange 205 and the multi-party concurrence server 1005 are geographically local to each other and so the communication between them also takes place over a geographically local interface 1003. However, the SMS exchange 205 and the multi-party concurrence server 1005 may be located in different geographical locations and in that case, the communication between them would be through the Internet 110 or other networks 130. It is to be noted that the system shown in FIG. 10 may include well-known internal connectors, architectures, interfaces, ports, and communication devices (e.g., modems) to enable processing and communication. For the purpose of simplicity and clarity, a detailed description of the same is omitted.

Figure 11:
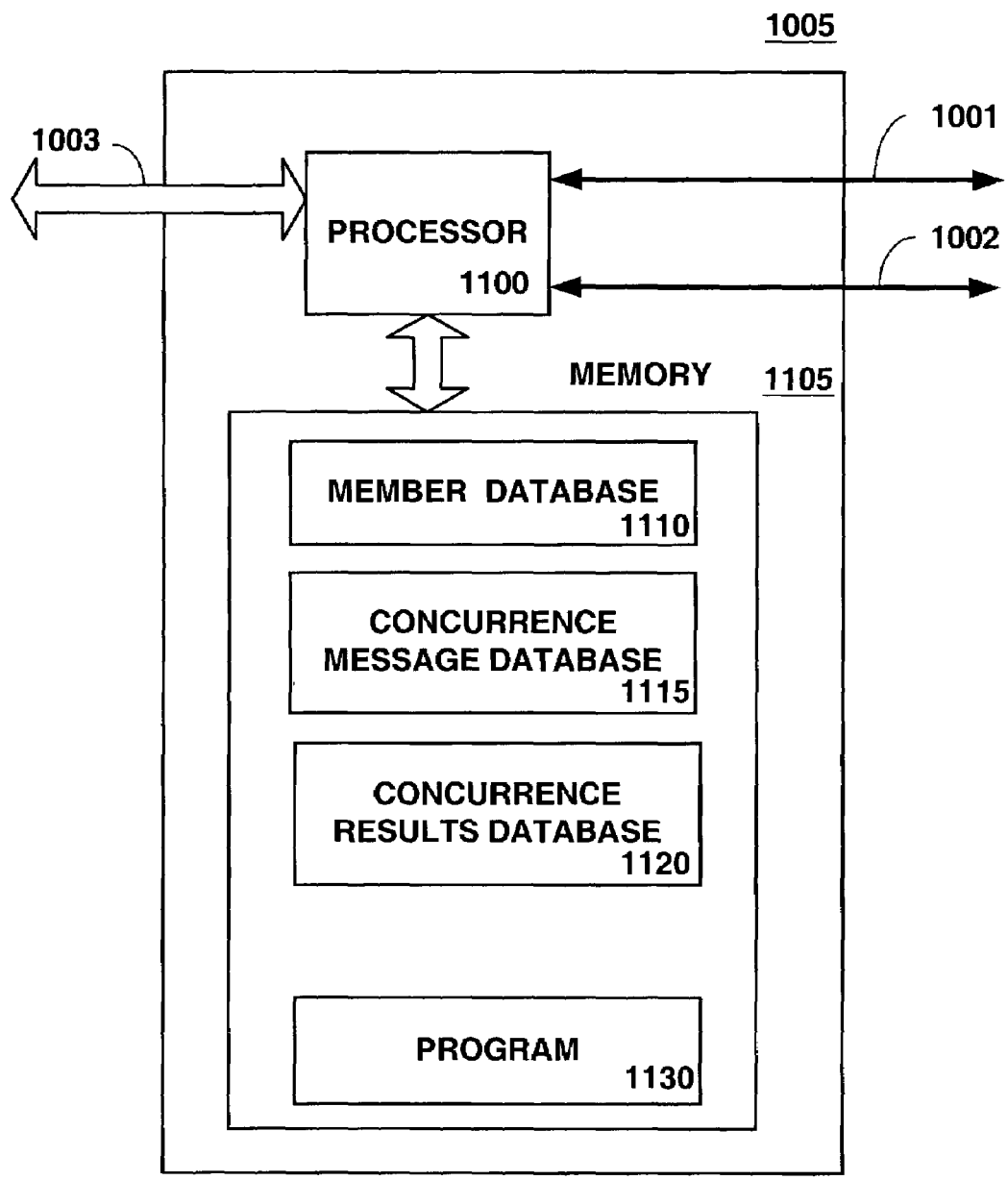
FIG. 11 depicts elements of the multi-party concurrence server of FIG. 10.

Referring next to FIG. 11, a diagrammatic representation of an embodiment of multi-party concurrence server 1005 is shown. The server 1005 typically includes memory 1105, and at least one processor 1100 in communication therewith. The processor 1100 is interfaced to the SMS exchange 205 to receive SMS messages sent by an initiator of a concurrence transaction. It must be noted that the processor 1100 is interfaced to the SMS exchange 205, PSTN, and the Internet through appropriate state-of-the-art interfaces, which are not shown in FIG. 11 for simplicity.

Memory typically includes one or more machine-readable media. Such media include, as is well known in the art, an appropriate combination of magnetic, semiconductor and optical media. Memory is preferably capable of supporting searching and storing of digital multimedia data such as text and audio. Memory (or portions thereof) may reside on a single computer, or may be distributed in a known manner among multiple computers that may be included in server.

In the present embodiment, memory 1105 includes member database 1110, concurrence message database 1115, and concurrence results database 1120. Memory also stores program 1130, which includes instructions for controlling the processor 1100 in accordance with the present invention.

The rows and columns of the databases described herein represent records and fields thereof, respectively. In the described embodiments, the databases are used in a relational arrangement, as is known in the art, so that the databases relate to one another by way of fields that store common data. It is to be noted that while the following description refers to specific individual databases, formats, records, and fields, those skilled in the art will readily appreciate that various modifications and substitutions may be made thereto without departing from the spirit and scope of the present invention.

Referring now to FIG. 12 an embodiment of member database 1110 is depicted in detail. Database 1110 stores data relating to member accounts that are maintained for account holders. Each record (row) of database 1110 represents such an account. For exemplary purposes, two records R1 and R2 are shown.

Field 1200A stores a member identifier that is associated with and that uniquely identifies a member account. In this embodiment, the member identifier is a four-digit member number. The number of digits in this field can be fixed depending on the maximum expected number of members in the system. Other types of member identifiers with alphanumeric characters may be used if required. Field 1200B is used to store the name of a member. In one embodiment, the name stored in field 1200B is a digital audio file (or a pointer thereto) that contains a pre-recorded audio sample of the account holder's name. The audio recording of member names may be played back while interacting with users with telephone or other voice playback instruments. Field 1200C stores the phone number of the member. It is possible to store multiple possible phone numbers here. Field 1200D stores a pass-code that is shown as a six-digit number in this embodiment. In general the pass-code can have any number of digits or alphanumeric characters. The pass-code is required to authenticate a bona fide member of the system.

Referring next to FIG. 13, an embodiment of concurrence message database 1115 is depicted in detail. Database 1115 stores data relating to one or more concurrence messages. One record (row) of database 1115 is maintained for each message. For exemplary purposes, three records R3, R4, and R5 are shown. Field 1300A stores a concurrence message identifier that uniquely identifies a concurrence message. For exemplary purposes, the concurrence message identifier is shown as including six digits. Field 1300B is used to store member identifiers of members participating in a concurrence transaction. Field 1300C stores the concurrence message for which concurrence of the participating members is to be obtained. The matter of the messages could be anything that can have quantifiable answers. While two valued answers such as yes/no and 1/0 are commonly envisaged in such concurrence operations, multiple valued answers are also possible. For example, a concurrence message such as 'Indicate your rating for the product using numbers 1 to 5' is a number from 1 to 5. Field 1300E stores the expiration time in terms of date and time. The expiration time is the deadline for members to respond to the concurrence message. Field 1300F stores the type of the concurrence message with regard to how the responses from the members are to be evaluated. Typical concurrence message types are 'ALL', '>50%', and 'ANY ONE' as shown in FIG. 13. An 'ALL' type indicates that responses from all members have to be the same for the concurrence to be successful. A concurrence message type '>50%' indicates that more than 50% of the members have to respond in the affirmative for the concurrence to be successful. An 'ANY ONE' type indicates that the concurrence is deemed successful if any-one of the members responds affirmatively to the message. The indicated message types are only for exemplary purpose. It may be noted that many other types of evaluating member responses are possible. For example, in cases wherein member response could be any number from within a given range, the concurrence could be deemed successful if the average exceeds a certain threshold.

Referring next to FIG. 14, an embodiment of concurrence results database 1120 is depicted in detail. For exemplary purposes, three records R6, R7, and R8 are shown. Field 1400A stores a concurrence message identifier that uniquely identifies a message. Field 1400B stores member identifiers of the members that are involved with regard to the concurrence message. Field 1400C stores the responses received from the different members. Field 1400D stores the date and time when the response from a member was received. Field 1400E stores the result of evaluation of the responses from the different members. As indicated the concurrence result could be 'SUCCESS' or 'FAILURE'. A 'PENDING' result indicates that the necessary number of members have not yet responded to arrive at the final result. The result of a concurrence message could be used in various ways to perform various functions. The multi-party concurrence servers can be programmed to provide the concurrence results to other servers for performing any required functions.

Concurrence Operation

Figure 15:
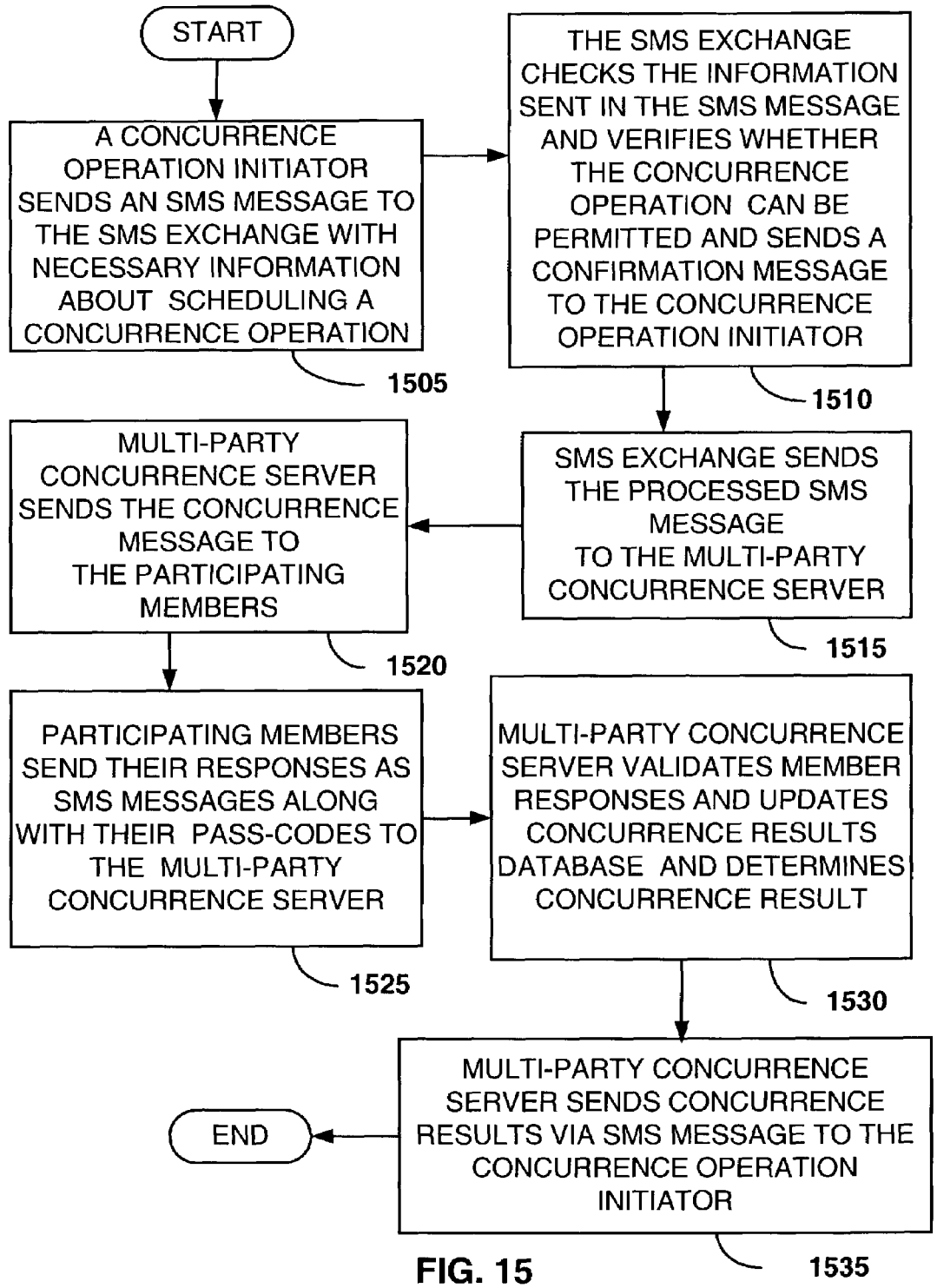
FIG. 15 shows a flowchart for a multi-party concurrence operation.

FIG. 15 shows a flowchart for a multi-party concurrence operation, including the following processes:

Process 1505: A concurrence operation is initiated and scheduled by a member by sending an SMS message to the SMS exchange 205 giving the necessary details of the concurrence operation. A typical SMS message is shown in FIG. 16 as an example. Basically, the SMS message contains a concurrence message, expiration date and time, type of concurrence, response value, member identifiers of the participating members and the initiating member to whom the result of concurrence is sent. The SMS message shown in FIG. 16 is just an example format with abbreviated keywords that refer to a concurrence operation. The abbreviations shown are: CM-Concurrence Message, CT-Concurrence Type, RV-Response Values, ED-Expiration Date, ET-Expiration Time, PM-Participating Member, and IM-Initiating Member. However, while sending a concurrence operation initiation request from a computer, better user interfaces may be provided. For example, a web page with a suitable form such as shown in FIG. 17 may be used.

Process 1510: The SMS exchange 205 processes the SMS message and checks whether all the information necessary for scheduling a concurrence operation is provided in the message. It also authenticates the identity of the concurrence operation initiator by means of the pass-code sent by him/her. Any missing information is communicated to the concurrence operation initiator via an SMS message or Internet message in case the concurrence operation was initiated through an Internet connected computer. After ascertaining that the concurrence operation can be scheduled, the SMS exchange sends a confirmation message to the concurrence operation initiator.

Process 1515: The SMS exchange 205 then processes the SMS message by performing functions such as, for example, appending information such as date and time of concurrence operation initiation to the SMS message and converting to a suitable format as required, and sends the processed SMS message to the multi-party concurrence server 1005.

Process 1520: The multi-party concurrence server 1005 sends SMS message containing the concurrence message to each of the participating members. The SMS message includes reply address of the multi-party concurrence server 1005 to which the participants have to send their responses via return SMS messages. While a basic system could transmit the concurrence SMS message just once, it is possible to have a feature of periodic retransmission of the message to a participant until he/she responds. Also, a reminder message may be sent to participants who have not responded just some time before the deadline for response.

Process 1525: Participating members send to the multi-party concurrence server 1005 SMS messages containing their pass-codes and their concurrence responses.

Process 1530: Multi-party concurrence server 1005 receives the responses from the participating members and validates each message as a response from a bona fide member by verifying the pass-code sent in each message. It then records the member responses in the concurrence results database 1120. At any point of time it may be possible to arrive at the final concurrence result depending on the number of members that have responded and the type of concurrence message. For example, the result for an 'ANY ONE' type of message can be determined as soon as receiving the first affirmative response, and for a '>50%', after receiving affirmative responses from 50% of the participating members.

Process 1535: Multi-party concurrence server 1005 sends an SMS message to the concurrence operation initiator informing about the completion of the concurrence operation and the concurrence result.

Applications

The basic function achieved by the above-described SMS based multi-party concurrence operation is changing the contents of a data structure in the server memory based on the responses received from two or more members. In simple cases, the data structure is just a data field with one data variable. However, it is possible to have any data structure whose constituent data values may be changed based on responses from multiple members. The concurrence operation can find many applications in real-world situations. Just to exemplify, a few examples are cited here. One application involves transfer of money to an account only if two or more persons agree to the transaction. In practice, the source of money could be a joint account held by multiple members. Another situation is a corporate scenario wherein two or more members in a committee are required to authorize the grant of funds to a third party. In such cases, the different members may be present in different geographic locations, and some of them may be on the move. The SMS based concurrence system can be used to complete transactions without requiring the members to physically sign a document. In the current state of the art, only a single person can access through SMS messages his/her account in a financial institution such as a bank and perform some allowed transactions in connection with his/her account. However, there is a need for a facility for two or more individuals to concur through SMS messages and allow a transaction such as funds transfer to take place. Executives on the move are greatly helped by such a service in performing financial transactions and indicating their concurrence with regards to any decisions. Once the multi-party concurrence server 1005 finds that all the members have agreed to the money transfer, and the successful concurrence has been reported, the concurrence initiator can take further steps to allow the money transfer to take place. Alternatively, the multi-party concurrence server 1005 could be made to automatically initiate steps for the money transfer in association with a financial institution that holds the source account.

Another application is the voting by multiple members to take a decision or elect someone for a position. Yet another application is the conduction of opinion poll among multiple members with regard to different issues or subjects.

Although the embodiments of the present invention have been shown and described in detail herein, those skilled in the art can readily devise many other varied embodiments that still incorporate these teachings. Thus, the previous description merely illustrates the principles of the invention. It will thus be appreciated that those with ordinary skill in the art will be able to devise various arrangements, which although not explicitly described or shown herein, embody principles of the invention and are included within its spirit and scope. Furthermore, all examples and conditional language recited herein are principally intended expressly to be only for pedagogical purposes to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention, as well as specific examples thereof, are intended to encompass both structural and functional equivalents thereof. Additionally, it is intended that such equivalents include both currently known equivalents as well as equivalents developed in the future, that is, any elements developed that perform the function, regardless of structure.

In addition, it will be appreciated by those with ordinary skill in the art that the block diagrams herein represent conceptual views of illustrative circuitry, equipment, and systems embodying the principles of the invention.

What is claimed is:

1. A method for registering concurrence among multiple members comprising
    sending a concurrence short message service (SMS) message to each participating one of the members at the request of a concurrence initiator,
    sending, in reply to the concurrence SMS message, a SMS response from each participating member to a concurrence server but not to the other participating members, and
    processing each SMS response in the concurrence server to arrive at a concurrence result transmitted to the concurrence initiator but not to the other participating members.

2. The method as recited in claim 1 wherein the contents of a data structure are modified based on each SMS response received from each participating member.

3. The method as recited in claim 1 wherein the concurrence SMS message is a query having an alpha-numeric response value.

4. The method as recited in claim 1 wherein the processing includes evaluating each SMS response based on predefined criteria to yield a concurrence result.

5. The method as recited in claim 1 further including transferring funds from an account controlled by the concurrence server in correspondence to the concurrence result.

6. The method as recited in claim 1 wherein the concurrence SMS message is formulated to conduct an opinion poll among multiple participating ones of the members.

7. A method for registering concurrence among multiple members comprising
    sending a concurrence short message service (SMS) message corresponding to a concurrence operation from a concurrence initiator to a SMS exchange,
    processing the concurrence SMS message in the SMS exchange to generate a processed SMS message corresponding to the concurrence operation,
    sending the processed SMS message to a multi-party concurrence server,
    determining information about participating ones of the members from the processed SMS message to form a participating member SMS message,
    sending the participating member SMS message to each participating member,
    sending, in reply to the participating SMS message, a SMS response from each participating member to the multi-party concurrence server,
    determining the concurrence result based on each SMS response in the multi-party concurrence server, and
    sending the concurrence result to the initiator from the multi-party concurrence server.

8. The method as recited in claim 7 wherein the concurrence SMS message is a query having an alpha-numeric response value.

9. The method as recited in claim 7 wherein the processing includes evaluating each SMS response based on predefined criteria to yield a two-valued concurrence result.

10. The method as recited in claim 7 further including transferring funds from an account controlled by the multi-party concurrence server in correspondence to the concurrence result.

11. The method as recited in claim 7 wherein the concurrence SMS message is formulated to conduct an opinion poll among multiple participating ones of the members.

12. A method for registering concurrence among multiple members comprising
    sending a concurrence short message service (SMS) message to each participating one of the members at the request of a concurrence initiator, the SMS message including a quantifiable query,
    sending, in reply to the concurrence SMS message, a SMS response from each participating member only to a concurrence server, the SMS response including an quantifiable value responsive to the quantifiable query, and
    processing each SMS response in the concurrence server to arrive at a concurrence result by evaluating each quantifiable value, the concurrence result then being transmitted only to the concurrence initiator.

13. The method as recited in claim 12 wherein contents of a data structure are modified based on each SMS response received from each participating member.

14. The method as recited in claim 12 wherein the query has an alpha-numeric response value.

15. The method as recited in claim 12 further including transferring funds from an account controlled by each participating member in correspondence to the concurrence result.

16. The method as recited in claim 12 wherein the concurrence SMS message is formulated to conduct an opinion poll among multiple participating ones of the members.

17. A method for registering concurrence among multiple members comprising
    sending a concurrence short message service (SMS) message corresponding to a concurrence operation from a concurrence initiator to a SMS exchange, the SMS message including a quantifiable query,
    processing the concurrence SMS message in the SMS exchange to generate a processed SMS message corresponding to the concurrence operation,
    sending the processed SMS message to a multi-party concurrence server,
    determining information about participating ones of the members from the processed SMS message to form a participating member SMS message,
    sending the participating member SMS message to each participating member,
    sending, in reply to the participating member SMS message, a SMS response from each participating member to a concurrence server but not to the other participating members, the SMS response including an quantifiable value responsive to the quantifiable query,
    determining the concurrence result based on each SMS response in the multi-party concurrence server by evaluating each quantifiable value, and
    sending the concurrence result to the initiator from the multi-party concurrence server.

18. A system for registering concurrence among multiple members comprising
- a short message service (SMS) exchange for receiving a concurrence SMS message from a concurrence initiator and for processing the concurrence SMS message to produce a processed SMS message, the processed SMS message including a quantifiable query, and
- a concurrence server responsive to the SMS exchange: for receiving the processed SMS message; for operating on the processed SMS message to determine participating ones of the members; for sending a participating member SMS message based upon the processed SMS message, including the quantifiable query, to each participating one of the members; for receiving a SMS response transmitted from each participating member but not to the other participating members, the SMS response message including a quantifiable value responsive to the quantifiable query; and for processing each SMS response message to arrive at a concurrence result transmitted to the concurrence initiator but not to the other participating members.

* * * * *